Nov. 27, 1962    R. F. ZIMMERMAN    3,066,001
RECIPROCATING HYDRAULIC MOTOR
Filed Sept. 15, 1961
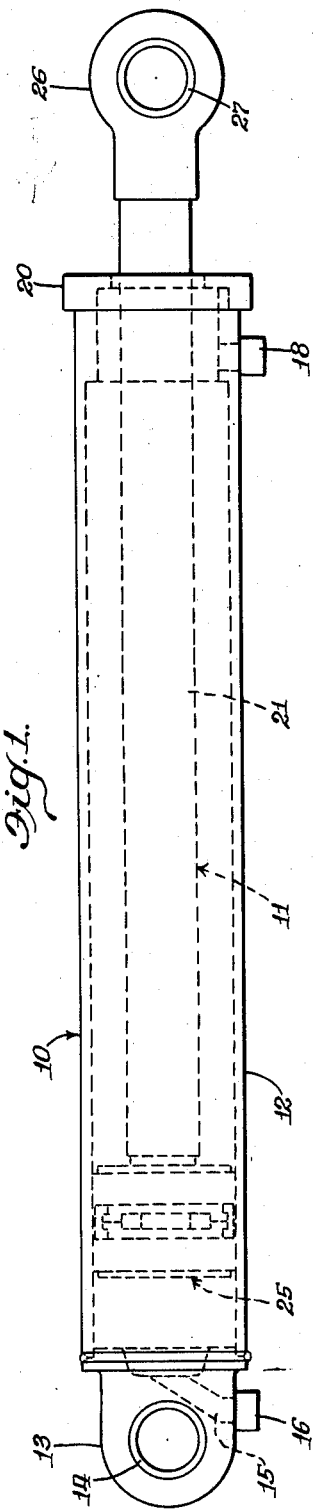
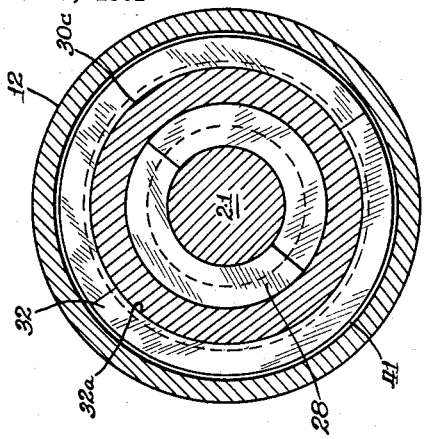
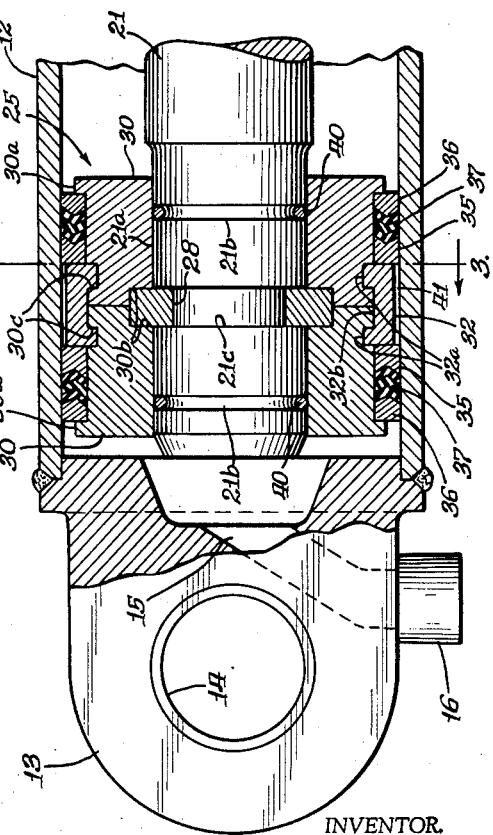
INVENTOR.
Richard F. Zimmerman
BY Paul O. Pippel
Atty.

United States Patent Office 3,066,001
Patented Nov. 27, 1962

3,066,001
RECIPROCATING HYDRAULIC MOTOR
Richard F. Zimmerman, Waukegan, Ill., assignor to The Frank G. Haugh Co., a corporation of Illinois
Filed Sept. 15, 1961, Ser. No. 138,462
14 Claims. (Cl. 309—4)

This invention relates generally to reciprocating hydraulic motor constructions, and more particularly to piston constructions for a reciprocating hydraulic motor.

The primary object of the invention is to provide a novel piston construction for a reciprocating hydraulic motor which is relatively simple to construct and assemble.

A further object of the invention is to provide a novel piston construction for a reciprocating hydraulic motor of a relatively large size such as used in large earth moving machines which will efficiently operate under the application of relatively high loading forces.

Still another object of the invention is to provide a novel piston head construction for a reciprocating hydraulic motor wherein no fasteners such as bolts are used to secure the piston head to the piston rod.

Still another object is to provide a two-piece piston head construction for a reciprocating hydraulic motor wherein the piston head is maintained in a locked condition on the piston rod by the cylinder portion of the motor.

Other objects and features of the present invention will be apparent upon a perusal of the following specification and drawings, in which:

FIGURE 1 is a side elevational view of a reciprocating hydraulic motor embodying the present invention;

FIGURE 2 is an enlarged view of a portion of the device shown in FIGURE 1 and taken partially in cross section; and FIGURE 3 is a cross sectional view of the structure shown in FIGURE 2 and taken along the line 3—3 of FIGURE 2.

The present embodiment is the preferred embodiment, but it is to be understood that changes can be made in the present embodiment by one skilled in the art wtihout departing from the spirit and scope of the present invention.

Generally, the present invention comprises a reciprocating hydraulic motor having a cylinder assembly with a piston assembly slidably carried therein for reciprocating movement relative to the cylinder assembly. Hydraulic fluid ports are provided at each end of the cylinder assembly for the connection of hydraulic fluid conduits thereto for operation of the motor.

The novel piston construction comprises the forming of the piston rod at one end thereof with an annular groove. A split ring is provided for the annular groove, and when carried therein projects radially outwardly thereof. Two substantially identical piston head sections are also provided and are carried on the piston rod, one on each side of the split ring. Each piston head section adjacent the cooperating or abutting sides of the piston head sections is provided with an annular groove in the outer periphery thereof. A second split ring having radially inwardly extending flanges is disposed about the outer periphery of the piston head sections over the abutting sides thereof and with the radially inwardly extending flanges positioned in the annular grooves thereof to lock the two piston head sections together on each side of the first split ring. The remote sides of the piston head sections are provided with annular flanges on the outer periphery thereof, and bearing and sealing rings are carried on the outer periphery of each piston head section between the flanges of the piston head sections and the second split ring. the entire piston head assembly is maintained together as a unit when the piston assembly is inserted in the cylinder portion of the motor. It should be noted that no nuts or bolts are used to secure the piston head sections together, nor are any used to secure the piston head sections to the piston rod. Any loading on the piston head sections in the cylinder assembly is transmitted through the first split ring to the piston rod.

In detail, the reciprocating hydraulic motor comprises a cylinder asesmbly 10 and a piston assembly 11 slidably carried therein for relative reciprocating movement therebetween. The cylinder assembly 10 comprises a cylindrical tube 12 with an internal surface which is relatively smooth. The head end of the cylinder 12 is provided with an end member 13 which is secured over the end of the cylinder 12 by any suitable means such as welding. The end member 13 is provided with a hole therethrough and with a bushing 14 carried in that hole for connection of the head end of the motor in some tool arrangement. The end member 13 is further provided with a passageway 15 extending from a port 16 on the outer surface thereof into a recess which opens into the cylinder 12.

The rod end of the cylinder 12 is provided with a port 18 therethrough for the connection of a hydraulic fluid conduit to deliver hydraulic fluid to the rod end of the cylinder 12. The rod end of the cylinder 12 is also provided with an end member 20 which may be secured thereto by any suitable means. The end member 20 is provided with a hole axially therethrough for the piston rod 21 of the piston assembly 11. Any suitable sealing means may be provided between the rod end of the cylinder 12 and the piston rod 21 to permit reciprocation of the piston assembly 11 relative to the cylinder assembly 10 without the leakage of any appreciable amount of hydraulic fluid between the end member 20 and the piston rod 21.

The piston assembly 11 comprises, in addition to the piston rod 21, a piston head assembly 25 carried on the inner end of the piston rod 21. The outer end of the piston rod 21 is provided with a member 26 having a hole therethrough which carries a bushing 27 for pivotally connecting the motor in a tool arrangement.

The inner end of the piston rod 21 is formed with a slightly reduced portion 21a, and the portion 21a is provided with two O-ring grooves 21b spaced one on each side of a relatively large annular groove 21c.

The annular groove 21c is provided for receiving therein the inner periphery of a split ring 28. The split ring 28 which is substantially rectangular in cross section, is formed of two semi-circular portions which cooperate to define a complete ring. The inner diameter of the split ring 28 is substantially equal to the inner diameter of the annular groove 21c of the piston rod 21. The outer diameter of the split ring 28 is greater than the diameter of the piston rod 21.

The piston head assembly 25 further comprises two identical annular piston head sections 30. The hole through each piston section 30 is of a diameter substantially equal to the diameter of the portion 21a of the piston rod 21. Each piston head section 30 is provided on the outer periphery and one side thereof with an integrally formed shoulder or annular flange 30a. The largest diameter of each piston head section 30, which is the diameter of the shoulder 30a, is less than the inner diameter of the cylinder 12. Each piston head section 30 is also provided on the side opposite from that having the shoulder 30a, with a circular recess 30b which is concentric with the hole through each piston head section 30. Each recess 30b has a depth substantially equal to one-half of the thickness of the split ring 28. The split ring 28 has a thickness substantially equal to the width of the annular groove 21c of the piston rod 21. Each circular recess 30b further has a diameter which is substantially equal to the outer diameter of the split ring 28. Each piston head section 30 is further provided with an annular groove 30c which is formed in the outer periphery thereof adjacent the side thereof having the circular recess 30b. The piston head assembly 25 further comprises a second split ring 32. The split ring 32 is formed to be somewhat U-shaped in cross section, and of two semi-circular portions which cooperate to define a complete ring. The second split ring 32 has an outer diameter surface which is slightly less than the inner diameter of the cylinder 12. The outer diameter surface of the split ring 32 is provided with a coating of bronze or other bearing material indicated at 41, which may be brazed to the surface of ring 32 so as to minimize the clearance between the cylinder 12 and the ring 32 and thus reduce wear on the cylinder 12. The second split ring 32 is provided on its inner periphery with two spaced apart annular flanges 32a separated by an annular groove 32b. Each of the annular flanges 32a has a width substantially equal to the width of the annular grooves 30c in the piston head sections 30. The inner diameter of the second split ring 32 at each annular flange 32a is substantially equal to the inner diameter of each annular groove 30c of the piston head sections 30. The annular groove 32b of the second split ring 32 has a width which is substantially equal to twice the distance that each annular groove 30c is spaced from the side of the piston head sections 30 having the recess 30b.

The piston head assembly 25 further comprises two sets of bearing rings 35 and 36 and sealing rings 37. The sealing rings 37 are substantially V-shaped in cross section and are formed of a fabric impregnated with a resilient material such as rubber or neoprene. One side of the bearing rings 35 is provided with a V-shaped recess conforming to the shape of the projecting side of the sealing rings 37. One side of the bearing rings 36 is provided with a V-shaped projection conforming to the depression side of the sealing rings 37. The bearing rings 35 and 36 are formed of a relatively soft bearing metal such as bronze. The bearing rings 35 and 36 and sealing rings 37 have an inner diameter substantially equal to the outer diameter of the piston head sections 30 adjacent to the annular shoulders 30a. The bearing rings 35 and 36 and the sealing rings 37 have an outer diameter substantially equal to the inner diameter of the cylinder 12.

The piston head assembly 25 is assembled when the piston rod 21 is removed from the cylinder 12. One of the piston head sections 30 is firstly placed on the portion 21a of the piston rod 21 over an O-ring 40 disposed in one of the O-ring grooves 21b. The side of the first piston head sections 30 having the recess 30b is positioned adjacent the annular groove 21c of the piston rod 21. The first piston head section 30 may initially have one set of bearing rings 35 and 36 and sealing rings 37 mounted thereon. The first piston head section 30 is initially positioned sufficiently away from the annular groove 21c of the piston rod 21 so that the two halves of the split ring 28 may be inserted into the annular groove 21c of the piston rod 21. The first piston head section 30 is then moved axially toward and over one-half of the first split ring 28, securely locking the first split ring 28 onto the piston rod 21 and within the recess 30b of that piston head section 30.

The second or other piston head section 30, with the second set of bearing rings 35 and 36 and sealing rings 37 mounted on the periphery thereof, may then be mounted over the end of the portion 21a of the piston rod 21 and a second O-ring 40.

The second piston head section 30 is mounted on the portion 21a of the piston rod 21 with the recess 30b thereof including the remaining portion of the first split ring 28. The two halves of the second split ring 32 are then assembled over the cooperating or abutting sides of the piston head sections 30 with the flanges 32a of the second split ring 32 projecting into the annular grooves 30c of the piston head sections 30. The portion of the second split ring 32 extending radially outwardly from the piston head sections 30 is disposed between the bearing rings 35 of each piston head section 30 and serves to retain the bearing rings 35 and 36 and the sealing rings 37 against axial movement relative to the piston head sections 30 between the shoulders 30a of the piston head sections 30. The second split ring 32 further secures the piston head assembly 25 together as a unit on the piston rod 21. The piston assembly 11 may then be inserted in the cylinder assembly 10 for reciprocating movement therein. Any loading forces on the piston head section 30 are transmitted through the first split ring 28 to the piston rod 21. Thus it may be seen that the piston head assembly 25 is securely locked to the piston rod 21 without the use of any fasteners such as bolts or nuts.

Having described the invention what is considered new and desired to be protected by Letters Patent is:

1. A piston assembly for a reciprocating hydraulic motor comprising, a piston rod having annular flange means extending radially outwardly therefrom at a position spaced from one end thereof, a pair of abutting piston head sections carried on said piston rod and positioned to enclose said flange means therebetween, and means on the outer periphery of said piston head sections and extending therebetween for locking said piston head sections together.

2. A piston assembly for a reciprocating hydraulic motor comprising, a piston rod having annular flange means extending radially outwardly therefrom at a position spaced from one end thereof, a pair of piston head sections abutting each other on one side thereof and carried on said piston rod and positioned to enclose said flange means between said abutting sides thereof, a radially outwardly extending annular shoulder formed on the outer periphery of each of said piston head sections at the other side thereof, two groups of bearing and sealing rings, each group of bearing and sealing rings carried on the outer periphery of one of said piston head sections against said shoulder thereof, and means positioned between said two groups of bearing and sealing rings for retaining each of said groups of bearing and sealing rings against said shoulder to prevent axial movement of said bearing and sealing rings relative to said piston head sections and for locking said piston head sections together.

3. A piston assembly for a reciprocating hydraulic motor comprising, a piston rod having annular flange means extending radially outwardly therefrom at a position spaced from one end thereof, a pair of abutting piston head sections carried on said piston rod and positioned to enclose said flange means therebetween, an annular groove formed in the outer periphery of each of said piston head sections at a position spaced from the abutting side thereof, and a split ring having radially inwardly extending flange portions, said split ring positioned about the outer periphery of said piston head sections and extending therebetween with said radially inwardly extending flange portions of said split ring positioned in said annular grooves in said head sections to lock said piston head sections together.

4. A piston assembly for a reciprocating hydraulic motor comprising, a piston rod having annular flange means extending radially outwardly therefrom at a position spaced from one end thereof, a pair of piston head sections abutting each other on one side thereof and carried on said piston rod and positioned to enclose said split ring between the abutting sides thereof, an annular shoulder formed on the outer periphery of each of said piston head sections at the other side thereof, two groups of bearing and sealing rings, each group of bearing and sealing rings carried on the outer periphery of one of said piston head sections against said shoulder thereof an annular groove formed in the periphery of each piston head section adjacent the abutting sides thereof, and a split ring having two radially inwardly extending flange portions, said split ring positioned about the periphery of said piston head sections between said two groups of bearing and sealing rings with the radially inwardly extending flange portions thereof positioned in said annular grooves in said piston head sections to lock said piston head sections together.

5. A piston assembly as defined in claim 4 wherein said split ring has an axial width sufficient to securely retain said two groups of bearing and sealing rings against said shoulders of said piston head sections to prevent any axial movement of said two groups of bearing and sealing rings relative to said piston head sections.

6. A piston assembly for a reciprocating hydraulic motor comprising, a piston rod having an annular groove formed therein at a position spaced from one end thereof, a split ring carried in said annular groove and extending radially outawrdly thereof, a pair of abutting piston head sections carried on said piston rod and positioned to enclose said split ring therebetween, and means extending between said pair of piston head sections for locking said piston head sections together.

7. A piston assembly for a reciprocating hydraulic motor comprising, a piston rod having an annular groove formed therein at a position spaced from one end thereof, a split ring carried in said annular groove and extending radially outwardly thereof, a pair of abutting piston head sections carried on said piston rod and positioned to enclose said split ring therebetween, and means carried on the outer periphery of said piston head sections and extending therebetween for locking said pair of piston head sections together.

8. A piston assembly for a reciprocating hydraulic motor comprising, a piston rod having an annular groove formed therein at a position spaced from one end thereof, a split ring carried in said annular groove and extending radially outwardly thereof, a pair of abutting piston head sections carried on said piston rod and positioned to enclose said split ring therebetween, two groups of bearing and sealing rings, each group of said bearing and sealing rings carried on the outer periphery of one of said piston head sections, means at the remote ends of said piston head sections for retaining one side of each group of bearing and sealing rings against axial movement relative to said piston head sections, and means on the outer periphery of said piston head sections between said two groups of bearing and sealing rings for retaining the other side of each of said groups of bearing and sealing rings against axial movement relative to said piston head sections and for locking said piston head sections together.

9. A piston assembly for a reciprocating hydraulic motor comprising, a piston rod having an annular groove formed therein at a position spaced from one end thereof, a split ring carried in said annular groove and extending radially outwardly thereof, a pair of piston head sections, each of said piston head sections having a radially outwardly extending annular shoulder formed on the outer periphery and at one side thereof, said pair of piston head sections carried on said piston rod and positioned to enclose said split ring between the other sides thereof, two groups of bearing and sealing rings, each group of bearing and sealing rings carried on the outer periphery of one of said piston head sections against said shoulder thereof, and means on the outer periphery of said piston head sections between said two groups of bearing and sealing rings for retaining said two groups of bearing and sealing rings against axial movement relative to said piston head sections and for locking said piston head sections together.

10. A piston assembly as defined in claim 9, wherein the outer diameter of said two groups of bearing and sealing rings is greater than the diameter of said shoulders, and said bearing and sealing rings extend radially outwardly of said retaining and locking means.

11. A piston assembly for a reciprocating hydraulic motor comprising, a piston rod having an annular groove formed therein at a position spaced from one end thereof, a split ring carried in said annular groove and extending radially outwardly thereof, a pair of abutting piston head sections carried on said piston rod and positioned to enclose said split ring therebetween, an annular groove formed in the outer periphery of each piston head section adjacent the abutting sides thereof, and a second split ring having radially inwardly extending flange portions, said second split ring positioned about the outer periphery of said piston head sections with the radially inwardly extending flange portions of said second split ring positioned in said annular grooves in said piston head sections to lock said piston head sections together.

12. A piston assembly for a reciprocating hydraulic motor comprising, a piston rod having an annular groove formed therein at a position spaced from one end thereof, and a split ring carried in said annular groove and extending radially outwardly thereof, a pair of piston head sections abutting each other on one side thereof and carried on said piston rod and positioned to enclose said split ring between the abutting sides thereof, an annular shoulder formed about the outer periphery of each of said piston head sections at the other side thereof, an annular groove formed in the outer periphery of each piston head section adjacent said one side thereof, a second split ring having radially inwardly extending flange portions at each end thereof, said second split ring positioned about the outer periphery of said piston head sections with the radially inwardly extending flange portions of said second split ring positioned in said annular grooves in said piston head sections to lock said piston head sections together, and bearing and sealing means carried about the outer periphery of each of said piston head sections between said shoulders and said second split ring and extending radially outwardly of said shoulders and said second split ring.

13. A piston assembly for a reciprocating hydraulic motor comprising, a piston rod having an annular groove formed therein at a position spaced from one end thereof, a split ring carried in said annular groove and extending radially outwardly thereof a certain distance, a pair of annular piston head sections, each of said piston head sections having an annular recess formed in one side thereof about the opening therethrough, each of said recesses having a depth substantially equal to one-half of the thickness of said split ring and a diameter substantially equal to the outer diameter of said split ring, said pair of piston head sections carried on said piston rod in an abutting relationship to each other with said split ring positioned in said recesses thereof, and means extending between said pair of piston head sections for locking said piston head sections together.

14. A piston assembly as defined in claim 13, wherein said last mentioned means comprises an annular groove formed in the outer periphery of each piston head section adjacent the abutting sides thereof, and a second split ring having radially inwardly extending flange portions at each end thereof, said radially inwardly extending flange portions of said second split ring having a diameter substantially equal to the inner diameter of said annular grooves formed in said piston head sections, said second split ring positioned about the periphery of said piston head sections with the radially inwardly extending flange portions of said second split ring positioned in said annular grooves in said piston head sections to lock said piston head sections together.

References Cited in the file of this patent

UNITED STATES PATENTS

| | | |
|---|---|---|
| 2,484,474 | Stock | Oct. 11, 1949 |
| 2,764,457 | Atkinson | Sept. 25, 1956 |